US008552963B2

United States Patent
Ito et al.

(10) Patent No.: US 8,552,963 B2
(45) Date of Patent: Oct. 8, 2013

(54) SWITCHING REGULATOR CONTROL CIRCUIT, CURRENT DRIVE CIRCUIT, LIGHT EMITTING APPARATUS, AND INFORMATION TERMINAL APPARATUS

(75) Inventors: Tomoyuki Ito, Kyoto (JP); Isao Yamamoto, Kyoto (JP)

(73) Assignee: Rohm Co., Ltd. (JP)

( * ) Notice: Subject to any disclaimer, the term of this patent is extended or adjusted under 35 U.S.C. 154(b) by 1522 days.

(21) Appl. No.: 11/792,033

(22) PCT Filed: Oct. 26, 2005

(86) PCT No.: PCT/JP2005/019672
§ 371 (c)(1),
(2), (4) Date: May 30, 2007

(87) PCT Pub. No.: WO2006/059437
PCT Pub. Date: Jun. 8, 2006

(65) Prior Publication Data
US 2007/0296353 A1    Dec. 27, 2007

(30) Foreign Application Priority Data
Nov. 30, 2004    (JP) .................................. 2004-345979

(51) Int. Cl.
*G05F 1/00*    (2006.01)
(52) U.S. Cl.
USPC ............... 345/102; 345/82; 345/83; 315/307; 361/837
(58) Field of Classification Search
USPC ............... 345/82, 83, 102; 315/307; 361/837
See application file for complete search history.

(56) References Cited

U.S. PATENT DOCUMENTS 6,073,034 A * 6/2000 Jacobsen et al. ............... 455/566
6,822,403 B2 11/2004 Horiuchi et al.
(Continued)

FOREIGN PATENT DOCUMENTS

JP    8-80035    3/1996
JP    2001-298516    10/2001
(Continued)

OTHER PUBLICATIONS

Chinese Office Action for Chinese Patent Application No. 2005-80038830.2 dated Apr. 11, 2008 with English translation.
(Continued)

*Primary Examiner* — Joseph Feild
*Assistant Examiner* — Linh N Hoffner
(74) *Attorney, Agent, or Firm* — Cantor Colburn LLP

(57) ABSTRACT

A control circuit may include a first feedback input terminal which receives the cathode terminal voltage of light-emitting elements from a current driving circuit as a feedback signal. Such an arrangement controls the ON/OFF state of a switching element such that the cathode terminal voltage approaches a predetermined voltage. A second feedback input terminal may be included to receive the anode terminal voltage of the light-emitting elements as a feedback signal. Such an arrangement controls the ON/OFF state of the switching element such that the anode terminal voltage does not exceed a predetermined threshold voltage. A feedback output terminal may be included of the current driving circuit which allows the cathode terminal voltage of the light-emitting elements to be input to a control circuit for the switching regulator as a feedback signal. The control circuit and the current driving circuit may be integrally provided in the form of separate semiconductor chips.

2 Claims, 2 Drawing Sheets

(56) References Cited

U.S. PATENT DOCUMENTS

| | | | |
|---|---|---|---|
| 7,459,959 B2* | 12/2008 | Rader et al. | 327/536 |
| 2003/0148784 A1* | 8/2003 | Sawamura et al. | 455/550 |
| 2004/0195978 A1* | 10/2004 | Horiuchi et al. | 315/291 |
| 2004/0208011 A1* | 10/2004 | Horiuchi et al. | 362/458 |
| 2005/0104542 A1* | 5/2005 | Ito et al. | 315/291 |
| 2005/0110469 A1* | 5/2005 | Inaba et al. | 323/222 |
| 2005/0140566 A1* | 6/2005 | Kim et al. | 345/1.1 |
| 2006/0089182 A1* | 4/2006 | Gartrell | 455/575.3 |

FOREIGN PATENT DOCUMENTS

| | | |
|---|---|---|
| JP | 2003-152224 | 5/2003 |
| JP | 2003-332624 | 11/2003 |
| JP | 2004-22929 | 1/2004 |
| JP | 2005-228979 | 8/2005 |
| KR | 2002-39273 A | 5/2002 |

OTHER PUBLICATIONS

International Search Report for International Application No. PCT/JP2005/019672 dated Jan. 31, 2006.

Written Opinion of the International Searching Authority for International Application No. PCT/JP2005/019672 filed Oct. 26, 2005 with English translation.

Japanese Office Action for Japanese Patent Application No. 2006-547685 dispatched May 25, 2010 with English translation.

Notification of Reason(s) for Refusal for Korean Patent Application No. 10-2007-7010459, dated Sep. 28, 2011, with English translation.

* cited by examiner

SWITCHING REGULATOR CONTROL CIRCUIT, CURRENT DRIVE CIRCUIT, LIGHT EMITTING APPARATUS, AND INFORMATION TERMINAL APPARATUS

CROSS REFERENCE TO RELATED APPLICATIONS

This is a U.S. national stage of application No. PCT/JP2005/019672, filed on 26 Oct. 2005. Priority under 35 U.S.C. §119(a) and 35 U.S.C. §365(b) is claimed from Japanese Application No. 2004-345979, filed 30 Nov. 2004, the disclosure of which is also incorporated herein by reference.

BACKGROUND OF THE INVENTION

1. Field of the Invention

The present invention relates to a control circuit for a switching regulator for driving light-emitting elements, a current driving circuit, and a light-emitting device including the control circuit and the current driving circuit.

2. Description of the Related Art

In recent years, information terminals such as cellular phones, PDAs (Personal Digital Assistants), etc., have come to include light emitting diodes (which will be referred to as "LEDs" hereafter) used as a backlight for a liquid crystal panel. In many cases, such information terminals employ a lithium-ion battery. However, in the normal state, such a lithium-ion battery provides output voltage of around 3.5 V. Even immediately after being fully charged, the lithium-ion battery provides only around 4.2 V. On the other hand, a voltage of 4 V or more is required to drive LEDs. Accordingly, there is a need to boost the battery voltage using a power supply device such as a switching regulator or the like as necessary in order to supply the necessary voltage to the LEDs.

In order to drive the LEDs by way of a load circuit using such a switching regulator, a current driving circuit is connected to the cathode terminals of LEDs, and feedback control is performed so as to maintain at a constant value the current that flows through the LEDs. Examples of such feedback control methods include a method which employs a detection resistor. With such an arrangement, while the LEDs are being driven, feedback control is performed so as to maintain at a constant value the voltage drop across the detection resistor (see Patent document 1). Also, examples of such feedback control methods include a method which employs a constant-current circuit that allows a predetermined current to flow through the LEDs, instead of the detection resistor. Such an arrangement also provides a constant driving current that flows through the LEDs (see Patent document 2).

As described above, such an arrangement for driving LEDs requires a switching regulator, a control circuit for controlling the switching operation of the switching regulator, and a current driving circuit connected to the cathode terminals of the LEDs.

[Patent Document 1]
Japanese Patent Application Laid-open No. 2003-152224
[Patent Document 2]
Japanese Patent Application Laid-open No. 2004-22929

In such circumstances, the present inventor has come to recognize the following problems.

With regard to the information terminals such as cellular phones, in recent years, the mainstream models have come to be folding models, which have a structure in which a first housing including a liquid crystal panel and a second housing including an operation unit are connected to each other. Let us consider an arrangement in which, of the peripheral circuits for driving the LEDs mounted on such a folding information terminal, a control circuit for a switching regulator and a current driving circuit are integrally provided in the form of an LED driving circuit. With such an arrangement, the LED driving circuit and the peripheral components thereof are mounted on the first housing side on which a liquid crystal panel is mounted.

On the other hand, the switching regulator requires, in the form of peripheral components: an inductor for performing energy conversion by receiving current supplied from a switching element; and a smoothing capacitor. Specifically, such components are mounted in the form of chip components. However, such an arrangement leads to a problem that the thickness of the first housing is dependent upon the heights of these peripheral components. On the other hand, from the commercial perspective, there is a great demand for smaller and slimmer information terminals. Accordingly, for such information terminals, it can be understood that this problem is a critical problem to be solved.

SUMMARY OF THE INVENTION

The present invention has been made in view of such a problem. Accordingly, it is a general purpose of the present invention to provide a control circuit for controlling a switching regulator, a current driving circuit, and a light-emitting device, which are mounted on a folding information terminal, and which provide a slimmer information terminal.

An embodiment of the present invention relates to a control circuit for a switching regulator which drives a light-emitting element. The control circuit comprises a first feedback input terminal which receives the cathode terminal voltage as a feedback signal from a current driving circuit connected to the cathode terminal of the light-emitting element. With such an arrangement, the ON/OFF state of a switching element of the switching regulator is controlled such that the cathode terminal voltage approaches a predetermined voltage.

The term "light-emitting element" as used here represents an element having a function of providing variable brightness which can be controlled by adjusting the current or voltage, examples of which include light-emitting diodes, organic EL elements, laser diodes, etc. With such an arrangement, the control circuit for the switching regulator includes the first feedback input terminal for receiving the cathode terminal voltage of the light-emitting element as a feedback signal. Furthermore, the control circuit is provided in the form of a separate integrated circuit that differs from the current driving circuit for driving the light-emitting element. Such an arrangement improves the degree of freedom in the layout of the light-emitting element, the switching regulator, the current driving circuit, and the peripheral components.

Also, the control circuit may further comprise a second feedback terminal which receives the anode terminal voltage of the light-emitting element as a feedback signal. Also, the ON/OFF state of the switching element may be controlled such that the anode terminal voltage does not exceed a predetermined threshold voltage.

With such an arrangement, the second feedback input terminal is provided for monitoring the anode terminal voltage. Let us consider a case in which the wiring line that connects the first feedback input terminal and the current driving circuit has broken, which leads to a situation in which the cathode terminal voltage of the light-emitting elements cannot be monitored. Even in such a case, such an arrangement prevents the driving voltage output from the switching regulator from increasing beyond a predetermined threshold voltage.

Another embodiment of the present invention relates to a current driving circuit which is connected to the cathode terminal of a light-emitting element driven by a switching regulator, and which controls the current that flows through the light-emitting element. The current driving circuit comprises: a constant-current circuit connected to the cathode terminal of the light-emitting element; and a feedback output terminal which inputs the cathode terminal voltage of the light-emitting element to a control circuit of the switching regulator as a feedback signal.

With such an arrangement, the current driving circuit for the light-emitting element includes the feedback output terminal for outputting the cathode terminal voltage of the light-emitting element. Furthermore, the current driving circuit is provided in the form of a separate integrated circuit that differs from the control circuit for the switching regulator. Such an arrangement improves the degree of freedom in the layout of the light-emitting element, the switching regulator, the current driving circuit, and the peripheral components.

Let us consider an arrangement in which multiple light-emitting elements are employed. With such an arrangement, the current driving circuit may further comprises a minimum value circuit which outputs a lowest voltage from among the voltages output from the cathode terminals of the light-emitting elements. Also, the output of the minimum value circuit may be input via the feedback output terminal as a feedback signal.

With such an arrangement, the lowest voltage among the cathode terminal voltages of the light-emitting elements is output as a feedback voltage input from the current driving circuit to the control circuit for the switching regulator. Such an arrangement offers stable operation of all the constant-current circuits.

Yet another embodiment of the present invention relates to a light-emitting device. The light-emitting device comprises: a light-emitting element; a switching regulator which is connected to the anode terminal of the light-emitting element, and which generates the driving voltage for driving the light-emitting element; a current driving circuit which is connected to the cathode terminal of the light-emitting element, and which controls the current that flows through the light-emitting element; and a control circuit which controls the ON/OFF state of a switching element of the switching regulator such that the voltage of the cathode terminal received from the current driving circuit as a feedback signal approaches a predetermined voltage. With such an arrangement, the current driving circuit and the control circuit are integrally provided in the form of separate semiconductor chips.

Such an arrangement improves the degree of freedom in the layout of the light-emitting element, the switching regulator, the current driving circuit, and the peripheral components.

Also, the light-emitting device may be mounted within an information terminal device having a structure in which a first housing and a second housing are foldably connected with each other via a connection portion. Also, the light-emitting element and the current driving circuit may be mounted within the first housing that includes a liquid crystal panel that operates using the light-emitting element as a backlight. Also, the switching regulator and a control circuit for the switching regulator may be mounted within the second housing. Also, a first wiring line, which connects the switching regulator and the anode terminal of the light-emitting element and which supplies the driving voltage, and a second wiring line, which connects the current driving circuit and the control circuit and which allows the voltage of the cathode terminal of the light-emitting element to be input as a feedback signal, are provided between the first housing and the second housing via the connection portion.

Yet another embodiment of the present invention relates to an information terminal device having a structure in which a first housing and a second housing are foldably connected with each other via a connection portion. With such an arrangement, the first housing comprises: a liquid crystal panel; and a current driving circuit which is connected to the cathode terminal of the light-emitting element, and which controls the current that flows through the light-emitting element. On the other hand, the second housing comprises: a battery; a switching regulator which generates a driving voltage for driving the light-emitting element using the voltage of the battery; and a control circuit which controls the ON/OFF state of a switching element of the switching regulator such that the voltage of the cathode terminal input from the current driving circuit as a feedback signal approaches a predetermined voltage.

With such an arrangement, the light-emitting elements and the current driving circuit are mounted on the first housing side, i.e., the liquid crystal panel side. On the other hand, the other circuit components are mounted on the second housing side. Such an arrangement provides a slimmer first housing.

Note that any combination of the aforementioned components or any manifestation of the present invention realized by replacement of a method, a device, a system, and so forth, is effective as an embodiment of the present invention.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

Figure 1:
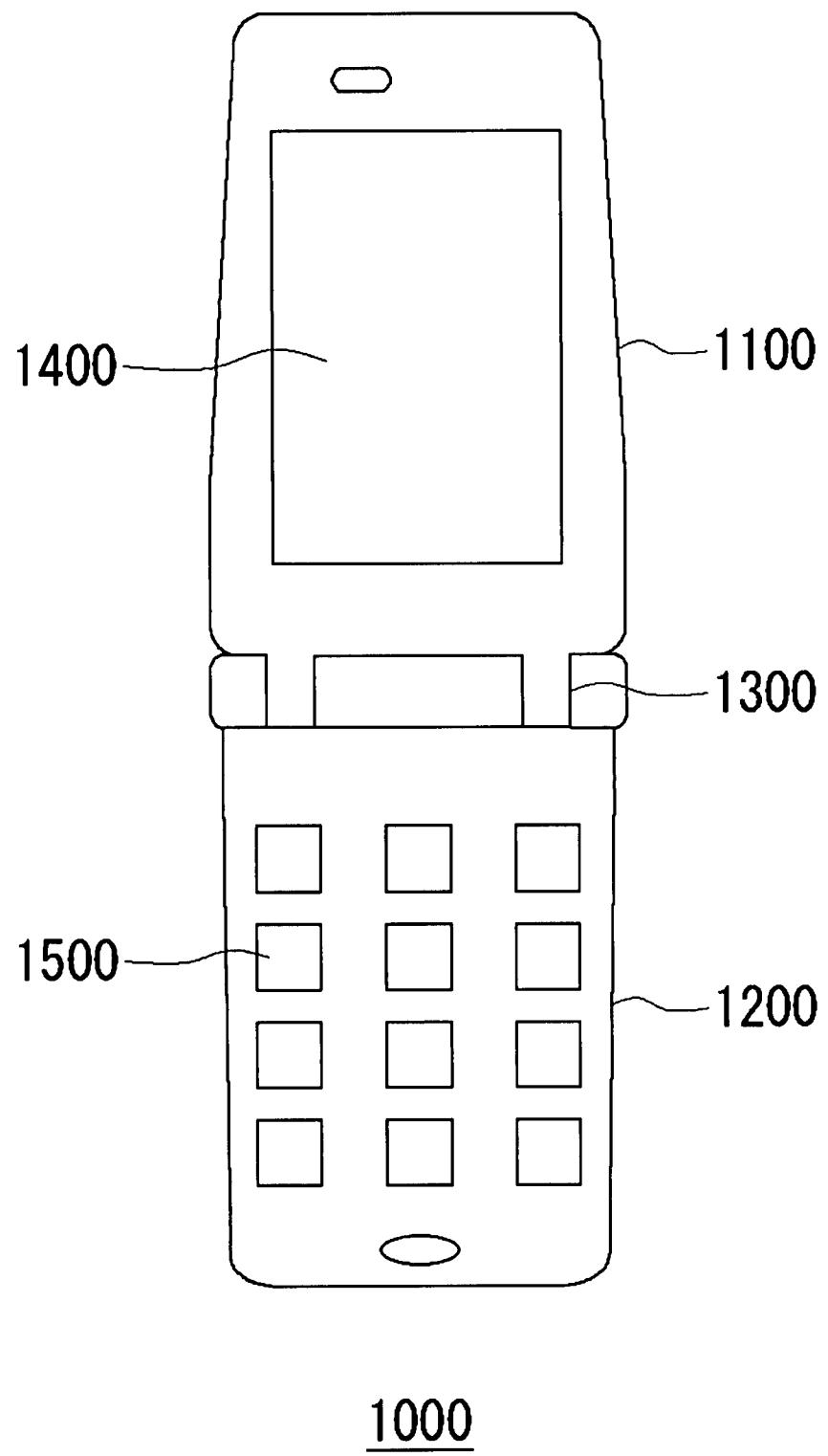
FIG. 1 is an external view of a cellular phone terminal on which a light-emitting device is mounted according to an embodiment of the present invention.

FIG. 1 is an external view of a cellular phone terminal 1000 on which a light-emitting device is mounted according to an embodiment of the present invention. The cellular phone terminal 1000 includes a first housing 1100 and a second housing 1200, which are connected to each other using a connection portion 1300 having a hinged structure, thereby providing a structure which allows a user to fold the cellular phone terminal.

A liquid crystal panel 1400 is disposed on the first housing 1100 side. On the other hand, operation buttons 1500 are disposed on the second housing 1200 side. A battery that serves as a power supply for the cellular phone terminal 1000 is provided to the rear face side of the second housing 1200.

The light-emitting device according to the present embodiment includes light-emitting diodes used as a backlight for the liquid crystal panel 1400, and a peripheral circuit for the light-emitting diodes.

Figure 2:
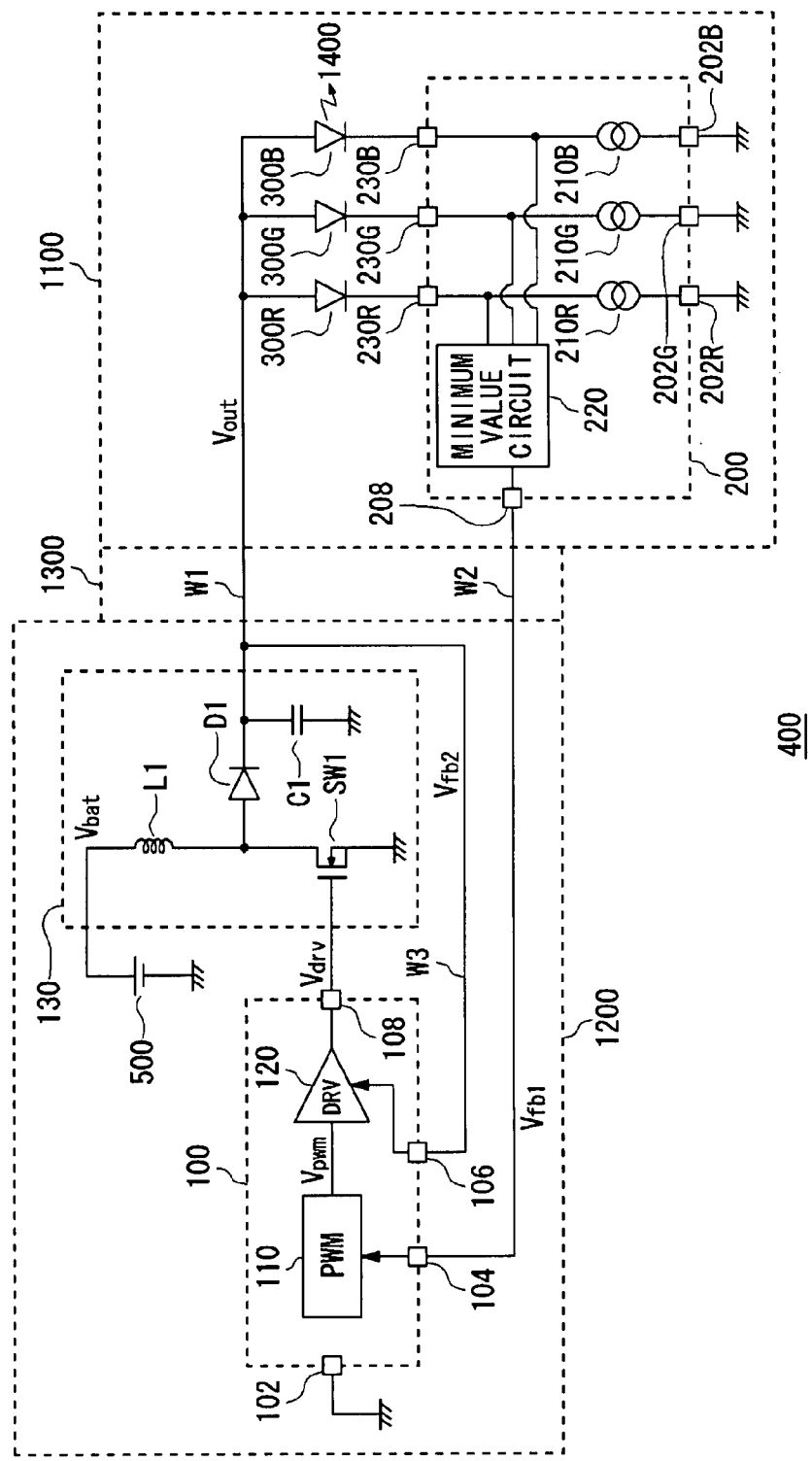
FIG. 2 is a circuit diagram which shows a configuration of the light-emitting device according to the present embodiment.

FIG. 2 is a circuit diagram which shows a configuration of a light-emitting device 400 according to the present embodiment.

The light-emitting device 400 includes light-emitting diodes 300R, 300G, and 300B, that correspond to the three primary colors, i.e., red, green, and blue (RGB). With such an arrangement, the light-emitting diodes that correspond to the respective three primary colors are turned on at the same time so as to provide white light, thereby offering a function as a backlight for the liquid crystal panel 1400.

The light-emitting device 400 includes: a current driving circuit 200 for controlling currents that flow through the light-emitting diodes 300R, 300G, and 300B; a switching regulator 130 for supplying driving currents to the light-emitting diodes 300R, 300G, and 300B; and a control circuit 100 for controlling the ON/OFF state of the switching element of the switching regulator 130.

The switching regulator 130 is a step-up DC/DC converter having a function of boosting the battery voltage Vbat output from a battery 500, thereby providing the voltage thus boosted as the output voltage Vout. The switching regulator 130 is connected to the anode terminals of the light-emitting diodes 300R, 300G, and 300B, and supplies the output voltage Vout to the light-emitting diodes 300R, 300G, and 300B.

The switching regulator 130 includes an inductor L1, a rectifier diode D1, an output capacitor C1, and a switching element SW1.

The inductor L1 and the switching element SW1 are connected with each other in series between the battery 500 and the ground potential. The switching element SW1 comprises a MOS transistor, which switches ON/OFF according to a pulse-width modulated switching signal that is applied to the gate terminal thereof.

Furthermore, the anode terminal of the rectifier diode D1 is connected to the connection between the inductor L1 and the switching element SW1. The output capacitor C1 is connected between the cathode terminal of the rectifier diode D1 and the ground potential.

With regard to the switching regulator 130, when the switching element SW1 is ON, a current flows from the battery 500 to the switching element SW1 via the inductor L1. On the other hand, when the switching element SW1 is OFF, the inductor L1 provides an inductive effect to maintain the current flow as it is during the ON state of the switching element SW1. Such a current flows toward the output capacitor C1. Specifically, the current is supplied to the output capacitor C1 via the rectifier diode D1, thereby charging the output capacitor C1.

With such an arrangement, the switching element SW1 is repeatedly switched ON/OFF, thereby providing energy conversion between the inductor L1 and the output capacitor C1. Thus, the battery voltage Vbat, which is an input voltage, is boosted, and the battery voltage thus boosted is smoothed by the output capacitor C1, thereby outputting the voltage thus smoothed as the output voltage Vout.

The current driving circuit 200 is connected to the cathode terminals of the light-emitting diodes 300R, 300G, and 300B. The current driving circuit 200 includes the constant-current circuits 210R, 210G, and 210B, and a minimum value circuit 220.

The constant-current circuits 210R, 210G, and 210B are each connected to the cathode terminals of the three light-emitting diodes 300R, 300G, and 300B, which correspond to red (R), green (G), and blue (B), respectively. The constant-current circuits 210R, 210G, and 210B, are connected to the light-emitting diodes 300R, 300G, and 300B, respectively, each of which controls the current that flows through the corresponding light-emitting diode.

The minimum value circuit 220 receives the voltages of the cathode terminals of the three light-emitting diodes 300R, 300G, and 300B, as input voltages. The minimum value circuit 220 outputs the lowest voltage from among these input voltages. The first feedback voltage Vfb1, which is the output of the minimum value circuit 220, is output from a feedback output terminal 208, and is input to the control circuit 100 as a feedback signal.

The control circuit 100 includes a pulse-width modulation circuit (which will be referred to as a "PWM circuit" hereafter) 110, and a driver circuit 120. With such a configuration, the control circuit 100 creates a switching signal for controlling the ON/OFF state of the switching element SW1 of the switching regulator 130, and outputs the switching signal thus created from a switching signal output terminal 108.

A first feedback input terminal 104 receives the first feedback voltage Vfb1 output as a feedback signal from the feedback output terminal 208 of the current driving circuit 200. A second feedback input terminal 106 receives, as the second feedback voltage Vfb2, the output voltage Vout output from the switching regulator 130.

The first feedback voltage Vfb1 is input to the PWM circuit 110. The PWM circuit 110 creates a pulse-width modulated PWM signal Vpwm with a constant frequency and with a variable ON time adjusted according to the first feedback voltage Vfb1. The PWM circuit 110 outputs the PWM signal Vpwm thus created to the driver circuit 120. The PWM circuit 110 creates the PWM signal Vpwm such that the first feedback voltage Vfb1 approaches a predetermined reference voltage Vref. Here, detailed description will be omitted regarding the PWM circuit 110. In brief, the PWM circuit 110 comprises: a computation amplifier which amplifies the difference between the first feedback voltage Vfb1 and the reference voltage Vref; and a voltage comparator which makes a comparison between the output Verr output from the computation amplifier and the triangular wave Vosc output from an oscillator. With such an arrangement, in a case that the Verr is greater than the Vosc, the voltage comparator outputs a high-level signal. On the other hand, in a case that the Verr is smaller than the Vosc, the voltage comparator outputs a low-level signal. Such an arrangement provides a pulse-width modulated signal with a variable high-level period, i.e., with a variable ON-time adjusted according to the voltage Verr.

Each of the constant-current circuits 210R, 210G, and 210B includes a transistor for current control between a corresponding terminal 230R, 230G, or 230B and a corresponding ground terminal 202R, 202G, or 202B. Saturation of the transistor occurs in a case that the voltage between the drain and the source of the transistor or the voltage between the collector and the emitter becomes equal to or smaller than a predetermined voltage. This leads to a situation in which stable electric current cannot be generated. With such an arrangement, the voltage to be applied to the cathode terminals of the light-emitting diodes 300R, 300G, and 300B, i.e., the reference voltage Vref (which serves as the target value of the first feedback voltage Vfb1), is preferably set to the smallest possible value in the range of voltages that permit stable operation of the constant-current circuits 210R, 210G, and 210B without the transistors becoming saturated.

With such an arrangement, the voltage applied to the cathode terminals of the light-emitting diodes 300R, 300G, and 300B is set to as low a value as possible. Such an arrangement reduces the output voltage Vout of the switching regulator 130, thereby reducing power consumption of the constant-current circuits 210R, 210G, and 210B.

The driver circuit 120 generates a driving signal Vdrv that alternately provides a high-level state and a low-level state, which can be switched according to the PWM signal Vpwm. The driving signal Vdrv is input to the gate terminal of the switching device SW1, thereby controlling the switching operation.

The second feedback voltage Vfb2 input to the second feedback input terminal 106 is input to the driver circuit 120. The driver circuit 120 makes a comparison between the second feedback voltage Vfb2 and a predetermined threshold voltage Vth. In a case that the Vfb2 is greater than the Vth, the driving signal Vdrv is set to a fixed low level state so as to stop the switching operation of the switching element SW1, whereupon the switching regulator 130 stops the step-up operation.

Next, description will be made regarding an arrangement in which the light-emitting device 400 having the above-described configuration is mounted to the cellular phone terminal 1000.

The circuit components enclosed by the broken line 1100 in FIG. 2 are mounted within the first housing 1100 shown in FIG. 1. In the same way, the circuit components enclosed by the broken line 1200 in FIG. 2 are mounted within the second housing 1200 shown in FIG. 1. On the other hand, the portion enclosed by the broken line 1300 corresponds to the connection portion 1300 shown in FIG. 1, which includes two connection wiring lines W1 and W2.

The liquid crystal panel 1400 of the cellular phone terminal 1000 is provided on the first housing 1100 side. Accordingly, the light-emitting diodes 300R, 300G, and 300B, which are used as a backlight for the liquid crystal panel 1400, are mounted on the first housing 1100 side.

On the other hand, the battery 500 of the cellular phone terminal 1000 is provided on the second housing 1200 side. Accordingly, the switching regulator 130 for boosting the battery voltage Vbat output from the battery 500 and the control circuit 100 for the switching regulator 130 are provided on the second housing 1200 side. Such a configuration reduces the area necessary for the wiring of the power supply lines.

Here, the inductor L1 and the output capacitor C1 included in the switching regulator 130 are provided in the form of chip components having a relatively large height or a relatively large area. However, with such an arrangement, the second housing 1200 has a margin of available volume capacity. Accordingly, in many cases, the size of the chip components does not lead to a problem of difficulty in mounting the chip components within the second housing 1200, as compared with mounting the chip components within the first housing 1100.

With the light-emitting device 400 according to the present embodiment, the current driving circuit 200 for controlling the brightness of the light-emitting diodes 300R, 300G, and 300B is provided on the first housing 1100 side. The cathode terminals of the light-emitting diodes 300R, 300G, and 300B are connected to the current driving circuit 200 via three wiring lines. With such an arrangement, all of these wiring lines are provided within the first housing 1100, thereby confining the wiring area to the minimum necessary.

A first wiring line W1 that connects the switching regulator 130 and each of the light-emitting diodes 300R, 300G, and 300B is provided between the first housing 1100 and the second housing 1200 via the connection portion 1300. The output voltage Vout of the switching regulator 130 is supplied to the light-emitting diodes 300 via the first wiring line W1, thereby driving the light-emitting diodes 300.

Also, a second wiring line W2 that connects the feedback output terminal 208 of the current driving circuit 200 and the first feedback input terminal 104 of the control circuit 100 is provided between the first housing 1100 and the second housing 1200 via the connection portion 1300 in the same way as with the first wiring line W1.

Furthermore, with the light-emitting device 400 according to the present embodiment, the control circuit 100 generates a switching signal while monitoring the output voltage Vout of the switching regulator 130. In order to perform such an operation, a third wiring line W3 is provided for connecting the output of the switching regulator 130 to the second feedback input terminal 106 of the control circuit 100. With such an arrangement, the third wiring line is provided within the second housing 1200.

With the light-emitting device 400 having such components mounted as described above according to the present embodiment, the control circuit 100 and the current driving circuit 200 are provided in the form of separate integrated circuits. Such an arrangement improves the degree of freedom in the layout, thereby further providing the following advantages.

With the light-emitting device 400 according to the present embodiment, the switching element SW1, the inductor L1, the rectifier diode D1, and the inductor L1 of the switching regulator 130, which are provided outside the LSI in the form of external components, are mounted on the second housing 1200 side. In many cases, such external components have a height that is larger than the thickness of the semiconductor integrated circuit. Thus, such an arrangement provides the first housing 1100 with a reduced thickness. On the other hand, before mounting the switching regulator 130, the second housing 1200 includes components that have a relatively large thickness, such as the battery 500 and so forth. Accordingly, in many cases, mounting the switching element SW1 and so forth on the second housing 1200 side does not require an increase in the thickness of the second housing 1200.

Thus, such an arrangement provides the cellular phone terminal 1000 that is slimmer and smaller overall.

Furthermore, the light-emitting device 400 according to the present embodiment includes two wiring lines, i.e., the first wiring line W1 and the second wiring line W2, provided to the connection portion 1300 having a hinged structure.

On the other hand, let us consider an arrangement in which the control circuit 100 and the current driving circuit 200 are integrally provided in the form of a single integrated circuit. With such an arrangement, in order to provide the first housing 1100 with a reduced size and a reduced thickness, all of the control circuit 100, the current driving circuit 200, and the switching regulator 130 should be mounted on the second housing 1200 side. However, with such an arrangement, there is a need to provide three wiring lines that connects the cathode terminals of the multiple light-emitting diodes 300R, 300G, and 300B, and the terminals 230R, 230G, and 230B of the current driving circuit 200 across the connection portion 1300. Furthermore, there is a need to provide the additional wiring line W1 that connects the switching regulator 130 and the anode terminals of the light-emitting diodes 300R, 300G, and 300B. Accordingly, there is a need to provide at least four wiring lines within the connection portion 1300.

The area necessary for the wiring increases according to the increase in the number of wiring lines that connect the first housing 1100 and the second housing 1200 via the connection portion 1300. Accordingly, the increased number of wiring lines is one factor hindering the miniaturization of the cellular phone terminal 1000. This means that the number of wiring lines that pass through the inside of the connection portion 1300 is preferably confined to the minimum necessary. With the light-emitting device 400 according to the present embodiment, the number of such wiring lines is confined to two, which is the minimum necessary, and which corresponds to the first wiring line W1 and the second wiring line W2. Thus, such an arrangement confines the area of the housing necessary for the wiring to the minimum necessary.

Furthermore, the wiring lines are provided within the connection portion 1300 in the form of an FPC (Flexible Printed Circuit), which has poor strength as compared with the wiring provided on a PCB (Printed Circuit Board).

Accordingly, the number of wiring lines that pass through the inside of the connection portion 1300 is preferably confined to the minimum necessary. With the light-emitting device 400 according to the present embodiment, the number of such wiring lines is confined to two, which is the minimum necessary, and which corresponds to the first wiring line W1 and the second wiring line W2. Thus, such an arrangement also suppresses adverse effects on reliability.

Also, with the light-emitting device 400 according to the present embodiment, the third wiring line W3 is provided within the second housing 1200 for inputting the output voltage Vout of the switching regulator 130 to the second feedback input terminal 106 of the control circuit 100 as a feedback signal.

Now, let us consider a case in which the second wiring line W2 provided within the connection portion 1300 has broken. In this case, the control circuit 100 receives the first feedback voltage Vfb1 of 0 V as a feedback signal. Accordingly, the control circuit 100 operates so as to control the ON/OFF state of the switching element SW1 such that the first feedback voltage Vfb1 approaches the predetermined reference voltage Vref. This can increase the output voltage Vout beyond the voltage necessary for driving the light-emitting diodes 300R, 300G, and 300B, leading to adverse effects on the reliability of the overall device.

With the light-emitting device 400 according to the present embodiment, the third wiring line W3 is only provided within the second housing 1200, thereby suppressing the risk of breakage of the third wiring line W3. With such an arrangement, the control circuit 100 controls the switching operation of the switching element SW1 such that the output voltage Vout input from the third wiring line W3 as a feedback signal does not exceed the predetermined threshold Vth. Such an arrangement prevents the output voltage Vout from increasing excessively, even in a case that the second wiring line W2 has broken, thereby improving the reliability of the cellular phone terminal 1000.

Also, with the light-emitting device 400 according to the present embodiment, the voltage of the cathodes of the light-emitting diodes 300R, 300G, and 300B are used as a feedback signal. Specifically, control is performed such that the cathode voltage approaches the predetermined voltage Vref. With such an arrangement, the reference voltage Vref is set to a voltage value around the minimum necessary for operating the constant-current circuits 210R, 210G, and 210B. Such an arrangement provides the minimum necessary output voltage Vout generated by the switching regulator 130, thereby providing the high-efficiency light-emitting circuit 400.

The above-described embodiments have been described for exemplary purposes only, and are by no means intended to be interpreted restrictively. Rather, it can be readily conceived by those skilled in this art that various modifications may be made by making various combinations of the aforementioned components or processes, which are also encompassed in the technical scope of the present invention.

With the present embodiment, the control circuit 100 and the switching element SW1 may be integrally provided in the form of a single unit. Also, the control circuit 100 and other circuit components may be integrally formed. The circuit components to be integrally formed should be decided on the basis of costs, the amount of space they occupy, etc.

Description has been made in the present embodiment regarding the cellular phone terminal 1000 as an example of the information terminal device. Also, the present invention can be broadly applied to folding information terminal devices that require a liquid crystal backlight, such as PDAs, second-generation cordless telephone systems, etc.

While the preferred embodiments of the present invention have been described using specific terms, such description is for illustrative purposes only, and it is to be understood that changes and variations may be made without departing from the spirit or scope of the appended claims.

The invention claimed is:

1. A light-emitting device mounted within an information terminal device in which a first housing including a liquid crystal panel and a second housing are foldably connected with each other via a connection portion, the light-emitting device comprising:
    a backlight for the liquid crystal panel comprising a plurality of light-emitting diodes mounted within the first housing and, the diodes being connected together by an anode terminal of each diode;
    a current driving circuit mounted within the first housing, connected to a cathode terminal of each of the plurality of light-emitting diodes, and configured to control current that flows through the plurality of light-emitting diodes;
    a switching regulator mounted within the second housing and configured to generate a driving voltage to be supplied to the anode terminal of each diode of the plurality of light-emitting diodes connected together; and
    a control circuit mounted within the second housing and configured to control the switching regulator,
    wherein the current driving circuit comprises, integrated on a semiconductor chip:
        a plurality of constant-current circuits respectively connected to the cathode terminals of the plurality of light-emitting diodes;
        a minimum value circuit configured to produce an output of a lowest cathode terminal voltage from among the measurement of the voltage at each cathode terminal of the light-emitting diodes; and
        a feedback output terminal configured to feed an output of the minimum value circuit back to the control circuit of the switching regulator; and
    wherein the control circuit comprises:
        a first feedback input terminal configured to receive the lowest cathode terminal voltage as a first feedback signal from the feedback output terminal of the current driving circuit;
        a second feedback input terminal configured to receive, as a second feedback signal, a measurement of a second voltage from each anode terminal of the plurality of light-emitting diodes that are connected together;
        a pulse modulator configured to generate a switching signal for controlling an on/off state of the switching regulator so that the lowest cathode terminal voltage at the first feedback input terminal approaches a predetermined voltage; and a driver circuit configured to drive the switching regulator based on the switching signal and to control the on/off state of the switching regulator so that the second voltage at the second feedback input terminal does not exceed a predetermined threshold voltage;

wherein the control circuit is integrated on a semiconductor chip which is separate from the semiconductor chip on which the current driving circuit is integrated, and the light-emitting device further comprises:

a first wiring line provided between the first housing and the second housing via the connection portion and connecting an output of the switching regulator and the connected anode terminals of the plurality of light-emitting diodes;

a second wiring line provided between the first housing and the second housing via the connection portion and connecting the feedback output terminal of the current driving circuit and the first feedback input terminal of the control circuit; and a third wiring line provided in the second housing and connecting the output of the switching regulator and the second feedback input terminal of the control circuit.

2. An information terminal device in which a first housing and a second housing are foldably connected with each other via a connection portion, the information terminal device comprising:

a liquid crystal panel mounted within the first housing;

a backlight for the liquid crystal panel comprised of a plurality of light-emitting diodes mounted within the first housing, the diodes being connected together by an anode terminal of each diode;

a current driving circuit mounted within the first housing, connected to a cathode terminal of each of the plurality of light-emitting diodes, and configured to control current that flows through the plurality of light-emitting diodes;

a switching regulator mounted within the second housing and configured to generate a driving voltage to be supplied to the anode terminal of each diode of the plurality of light-emitting diodes connected together; and a control circuit mounted within the second housing and configured to control the switching regulator, wherein the current driving circuit comprises, integrated on a semiconductor chip:

a plurality of constant-current circuits respectively connected to the cathode terminals of the plurality of light-emitting diodes;

a minimum value circuit configured to produce an output of a lowest cathode terminal voltage from among the measurement of the voltage at each cathode terminal of the light-emitting diodes; and a feedback output terminal configured to feed an output of the minimum value circuit back to the control circuit of the switching regulator; and wherein the control circuit comprises:

a first feedback input terminal configured to receive the lowest cathode terminal voltage as a first feedback signal from the feedback output terminal of the current driving circuit;

a second feedback input terminal configured to receive, as a second feedback signal, a measurement of a second voltage from each anode terminal of the plurality of light-emitting diodes that are connected together;

a pulse modulator configured to generate a switching signal for controlling an on/off state of the switching regulator so that the lowest cathode terminal voltage at the first feedback input terminal approaches a predetermined voltage; and a driver circuit configured to drive the switching regulator based on the switching signal and to control the on/off state of the switching regulator so that the second voltage at the second feedback input terminal does not exceed a predetermined threshold voltage;

wherein the control circuit is integrated on a semiconductor chip which is separate from the semiconductor chip on which the current driving circuit is integrated, and the light-emitting device further comprises:

a first wiring line provided between the first housing and the second housing via the connection portion and connecting an output of the switching regulator and the connected anode terminals of the plurality of light-emitting diodes;

a second wiring line provided between the first housing and the second housing via the connection portion and connecting the feedback output terminal of the current driving circuit and the first feedback input terminal of the control circuit; and a third wiring line provided in the second housing and connecting the output of the switching regulator and the second feedback input terminal of the control circuit.

* * * * *